(12) United States Patent
Schueler

(10) Patent No.: US 7,420,163 B2
(45) Date of Patent: ***Sep. 2, 2008

(54) DETERMINING LAYER THICKNESS USING PHOTOELECTRON SPECTROSCOPY

(75) Inventor: Bruno Schueler, San Jose, CA (US)

(73) Assignee: ReVera Incorporated, Sunnyvale, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 11/118,035

(22) Filed: Apr. 29, 2005

(65) Prior Publication Data

US 2006/0243904 A1    Nov. 2, 2006

(51) Int. Cl.
*G01N 23/227* (2006.01)

(52) U.S. Cl. ............... 250/305; 250/306; 250/307; 250/310; 324/702; 324/716; 324/751; 378/45; 378/50

(58) Field of Classification Search ............... 250/305, 250/306, 307, 310; 324/702, 716, 751; 378/45, 378/50
See application file for complete search history.

(56) References Cited

U.S. PATENT DOCUMENTS

| | | | | |
|---|---|---|---|---|
| 4,169,228 A | * | 9/1979 | Briska et al. | 378/45 |
| 4,492,740 A | | 1/1985 | Yamamoto et al. | |
| 4,967,152 A | * | 10/1990 | Patterson | 324/752 |
| 5,280,176 A | * | 1/1994 | Jach et al. | 250/305 |
| 5,995,916 A | | 11/1999 | Nixon et al. | |
| 6,326,617 B1 | | 12/2001 | Tomie et al. | |
| 6,349,128 B1 | * | 2/2002 | Nelson | 378/44 |
| 6,399,944 B1 | * | 6/2002 | Vasilyev et al. | 250/310 |
| 6,800,852 B2 | * | 10/2004 | Larson et al. | 250/305 |
| 6,850,079 B2 | * | 2/2005 | Yamada et al. | 324/702 |
| 6,891,158 B2 | * | 5/2005 | Larson et al. | 250/305 |
| 7,231,324 B2 | | 6/2007 | Orrock et al. | |
| 2002/0190207 A1 | * | 12/2002 | Levy et al. | 250/306 |
| 2005/0092920 A1 | * | 5/2005 | Lee et al. | 250/305 |
| 2006/0247899 A1 | * | 11/2006 | Orrock et al. | 702/189 |

OTHER PUBLICATIONS

Seah ("Quantificatoin of AES and XPS" in Practical Surface Analysis, vol. 1, Wiley: New York, 1990).*
Godbole (Silicon to Tungsten Ratio Determination in Tungsten Silicide Using XRF: 0-7803-6691-3/01 IEEE 2001 pp. 46-50).*

(Continued)

*Primary Examiner*—Jack I. Berman
*Assistant Examiner*—Michael Maskell
(74) *Attorney, Agent, or Firm*—Blakely, Sokoloff, Taylor & Zafman LLP

(57) ABSTRACT

According to one embodiment of the invention, photoelectron spectroscopy is used to determine the thickness of one or more layers in a single or multi-layer structure on a substrate. The thickness may be determined by measuring the intensities of two photoelectron species or other atom-specific characteristic electron species emitted by the structure when bombarded with photons. A predictive intensity function that is dependent on the thickness of a layer is determined for each photoelectron species. A ratio of two predictive intensity functions is formulated, and the ratio is iterated to determine the thickness of a layer of the structure. According to one embodiment, two photoelectron species may be measured from a single layer to determine a thickness of that layer. According to another embodiment, two photoelectron species from different layers or from a substrate may be measured to determine a thickness of a layer.

28 Claims, 11 Drawing Sheets

OTHER PUBLICATIONS

International Search Report and Written Opinion from PCT/US06/14945 mailed Nov. 19, 2007, 14 pgs.

International Preliminary Report on Patentability from PCT/US2006/014945 mailed Dec. 21, 2007, 9 pgs.

* cited by examiner

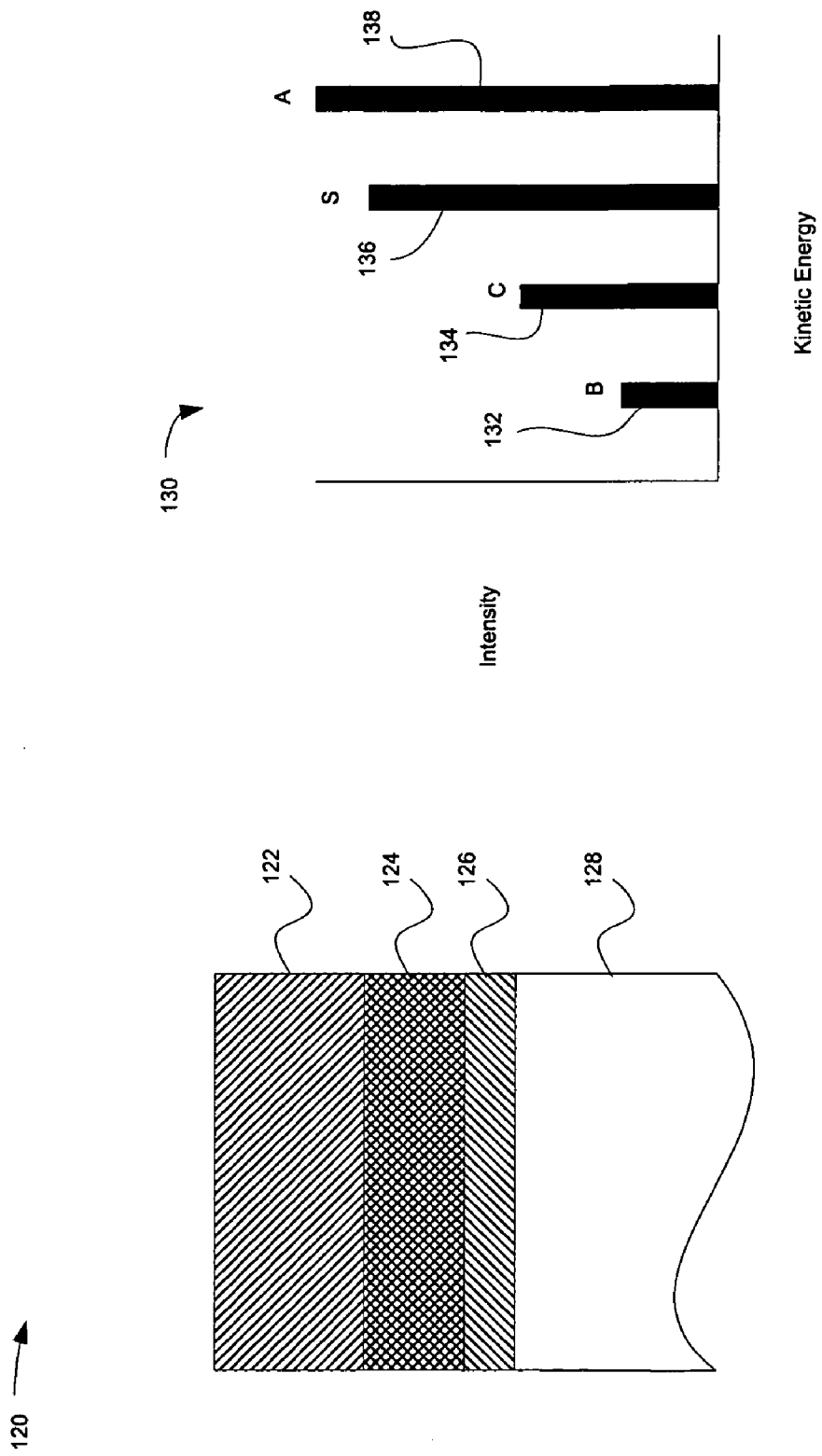

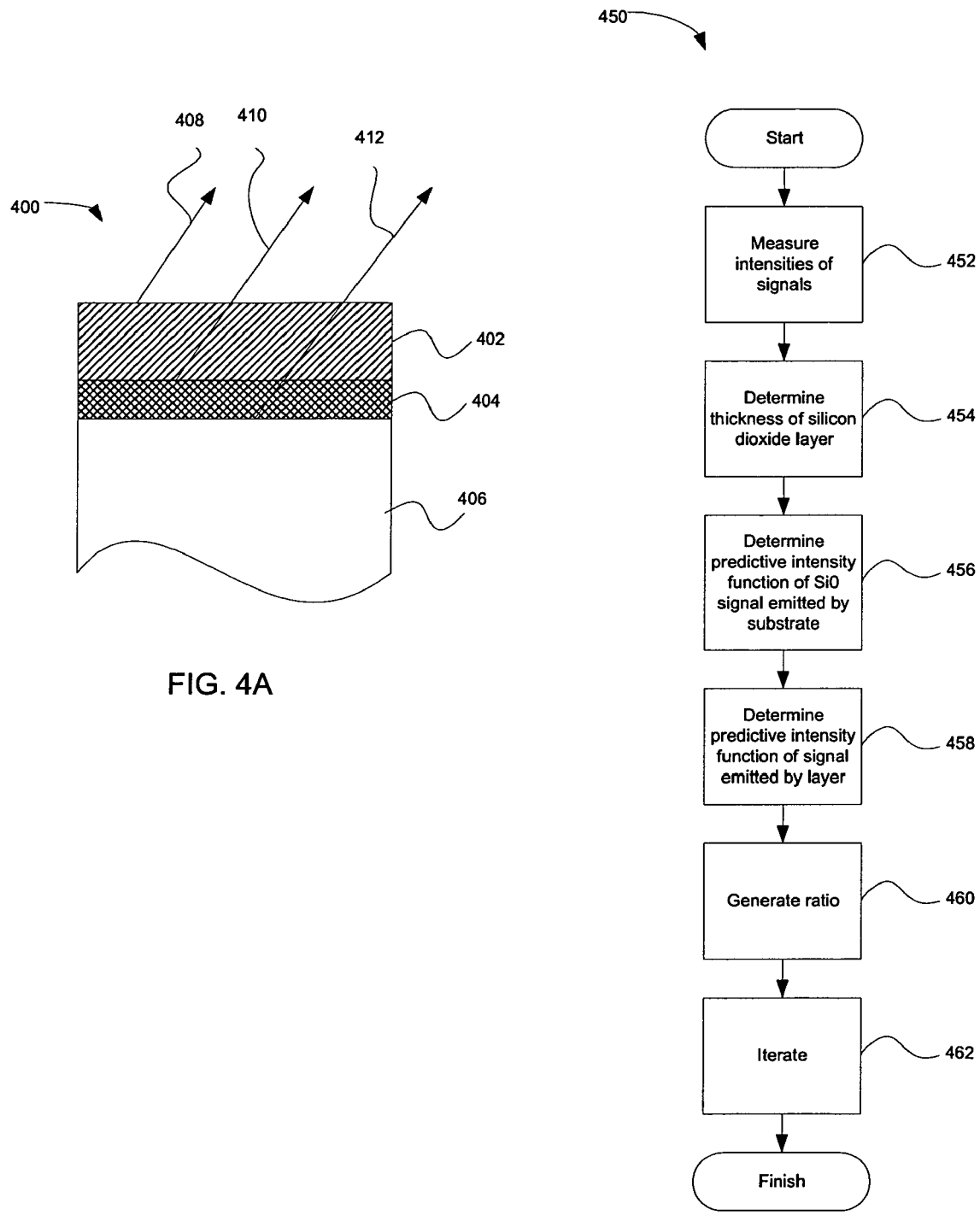

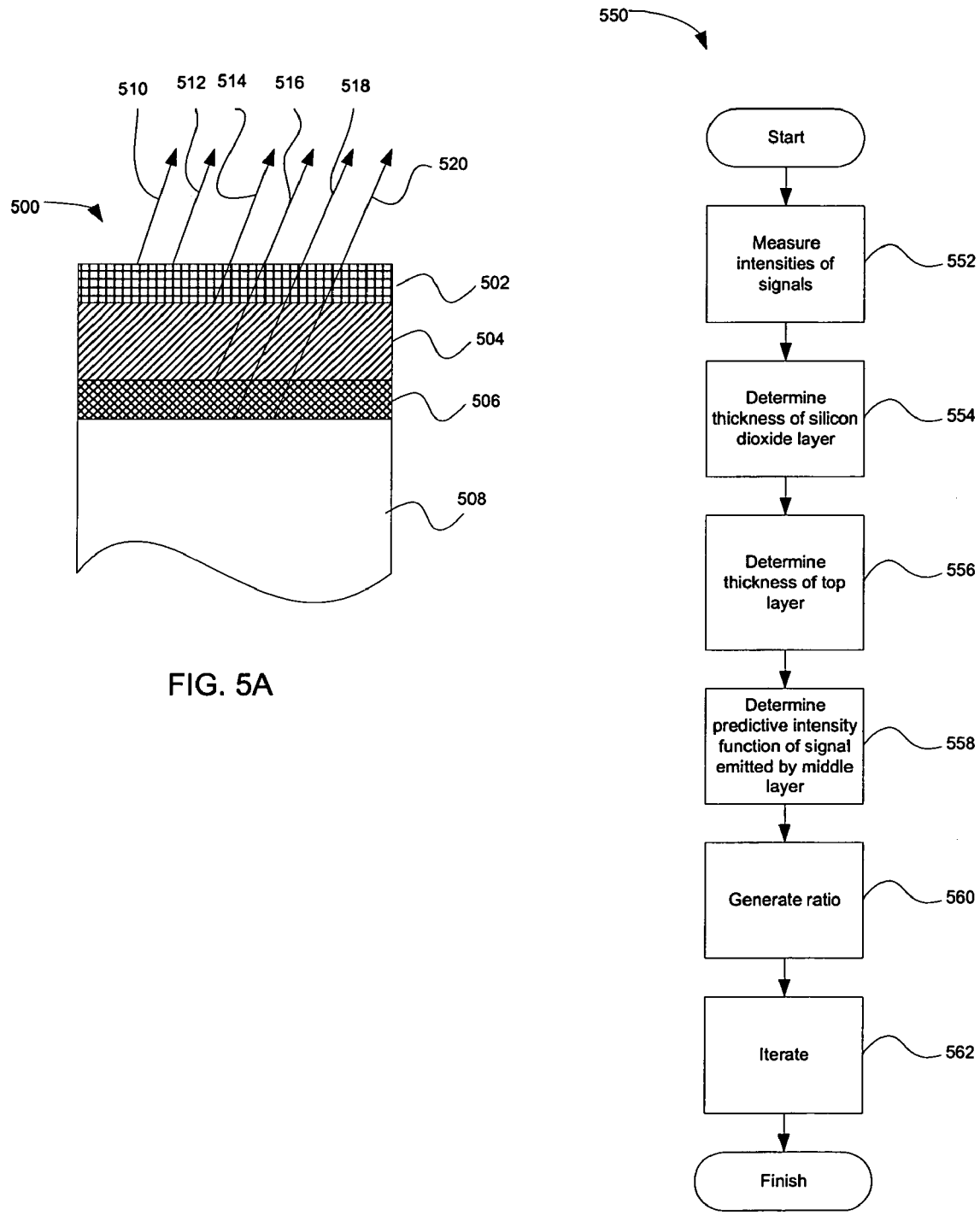

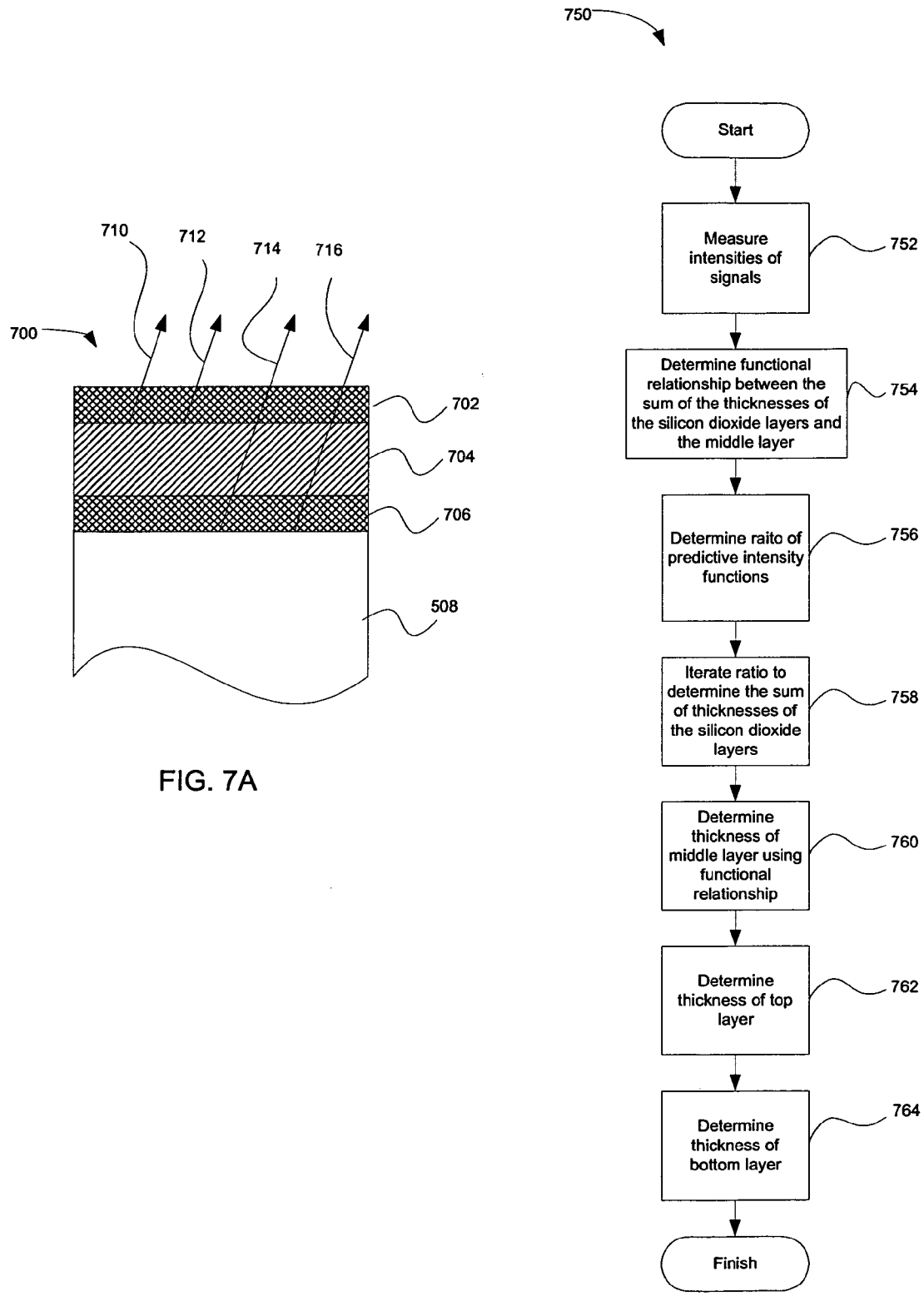

DETERMINING LAYER THICKNESS USING PHOTOELECTRON SPECTROSCOPY

FIELD OF THE INVENTION

The invention generally relates to techniques for examining microelectronic structures and specifically to techniques for measuring layer thickness using photoelectron spectroscopy.

BACKGROUND

Integrated circuits typically comprise a number of layers formed on a silicon substrate. As integrated circuits become smaller, and the thickness of layers comprising the integrated circuits is reduced, the behavior of devices formed from these layers often depends on the thickness of a specific layer. For example, a transistor formed on a silicon substrate may have different characteristics depending on the thickness of the gate of the transistor. It may therefore be useful to determine a thickness of a layer in a microelectronic device such as an integrated circuit.

The thickness of a layer in a microelectronic device such as an integrated circuit may be determined using one of several techniques. The microelectronic device typically includes a structure including several layers built up over a substrate. Ellipsometry, using an electron probe with wavelength dispersive spectrometer(s), angle-resolved x-ray photoelectron spectroscopy (XPS), and secondary ion mass spectrometry (SIMS) are techniques that may be used to determine a thickness of a specific layer in a structure.

Ellipsometry includes directing polarized light at the surface of a structure, and measuring a shift in polarization of light reflected off of the surface. Ellipsometry may be difficult to use with very thin layers (e.g., less than 1 nanometer (nm)), because of weak optical response. Since layers are becoming increasingly thin, the applications of ellipsometry are becoming more limited. Further, ellipsometry can only determine the thickness of one layer in ultra-thin multi layer film structures.

An electron probe with wavelength dispersive spectrometer(s) irradiates a layer with medium-energy electrons. The thickness of multiple layers can be inferred by the measurement of characteristic x-rays corresponding to different layers. However, film damage is a concern because of the irradiation. Further, interfacial silicon oxide layers underneath an oxide (e.g., a silicon dioxide layer underneath a hafnium oxide layer) are difficult to measure accurately because the technique cannot distinguish between the different chemical states of silicon.

Angle-resolved XPS uses photoelectron spectroscopy to determine a thickness of a layer. Photoelectron spectroscopy bombards a sample with photons having a specific wavelength (here, x-ray photons), which excites the atoms of the sample to generate a photoelectron having a characteristic energy for the sample. The technique depends on measuring photoelectrons at different emission angles from the sample surface, for example by tilting the sample with respect to an electron energy analyzer. For metrology applications, the technique is expected to be deficient in meeting high measurement throughput requirements due to lack in signal intensity, which either results in poor measurement precision or long analysis time.

SIMS uses a focused ion beam directed toward the surface of a sample. The bombardment by low or medium energy ions leads to the ejection of both neutral and charged species from the surface of the sample. The ejected charged species are measured using a mass spectrometer by monitoring the signal intensity of one or more suitable ion species as a function of time. Assuming a constant material removal rate for a given material and primary ion current, the analysis time required to observe a defined change in signal intensity of a suitable ion species is converted into a depth scale, which is used to determine layer thickness. However, SIMS is a destructive process, as the species ejected and analyzed are a portion of the layer being measured.

BRIEF DESCRIPTION OF THE DRAWINGS

One or more embodiments of the present invention are illustrated by way of example and not limitation in the figures of the accompanying drawings, in which like references indicate similar elements and in which:

FIGS. 1A-1D illustrate two multi-layer structures and the intensities of different photoelectron signals emitted by the structures when subjected to photoelectron spectroscopy;

FIG. 4A illustrates a two-layer structure including a silicon dioxide layer;

FIG. 4B is a flowchart describing a process for determining a thickness of a top layer of the structure;

FIG. 5A illustrates a three-layer structure including a layer of silicon dioxide;

FIG. 5B is a flowchart describing a process for determining a thickness of two of the layers of the three-layer structure;

FIG. 7A illustrates a structure including two silicon dioxide layers;

FIG. 7B is a flowchart describing a process for determining a thickness of a layer between the two silicon dioxide layers;

DETAILED DESCRIPTION

According to one embodiment of the invention, electron spectroscopy is used to determine the thickness of one or more layers in a single or multi-layer structure on a substrate. The thickness may be determined by measuring the intensities of two electron species emitted by the structure when bombarded with photons, electrons, etc. A predictive intensity function that is dependent on the thickness of a layer is determined for each electron species. A ratio of two predictive intensity functions is formulated, and the ratio is iterated to determine the thickness of a layer of the structure. According to one embodiment, two electron species may be measured from a single layer to determine a thickness of that layer. According to another embodiment, two electron species from different layers or from a substrate may be measured to determine a thickness of a layer. Several techniques for determining the thickness of different layers in different configurations are described below.

An elemental species refers to the chemical composition of a specific layer or substrate. For example, a hafnium oxide layer includes the elemental species of hafnium and oxygen. An electron species refers to an electron having a characteristic energy. A single elemental species may emit several different electron species. For example, a silicon substrate may emit two different characteristic electrons having different kinetic energies. One electron may be emitted from the 2p orbital of the silicon atom, while the other electron may be emitted from the 2s shell of the silicon atom. An electron signal hereinafter refers to a stream of electrons belonging to a specific electron species. For example, the 'Hf4f signal' comprises the electrons emitted by the 4f orbital of hafnium. Many of the examples discussed below refer to photoelectrons, or electrons that are emitted when a layer is bombarded with photons. Each elemental species may emit one or more photoelectron species, which may comprise a photoelectron signal.

Figure 1B:
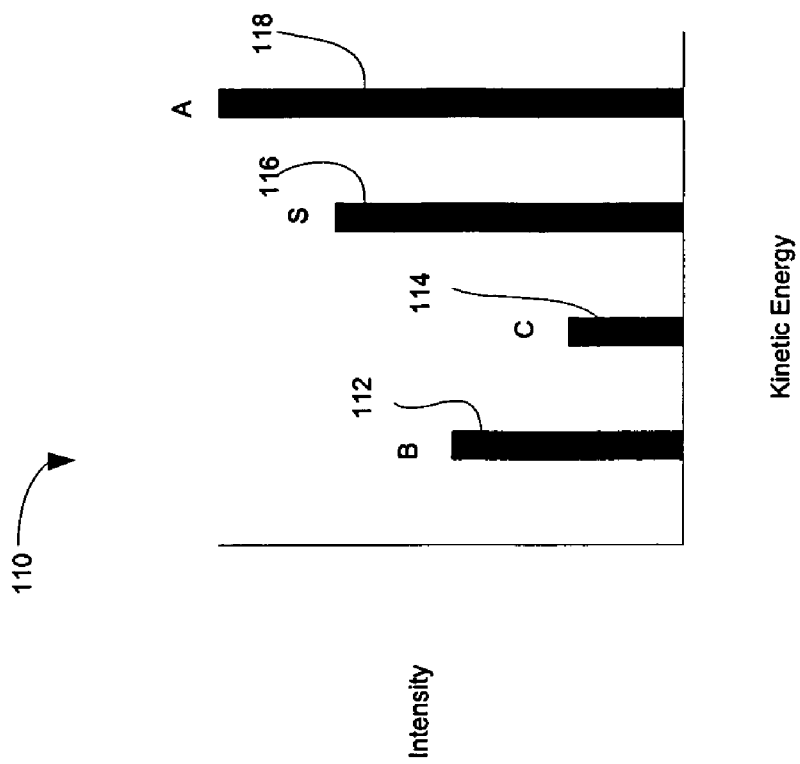
Figure 1A:
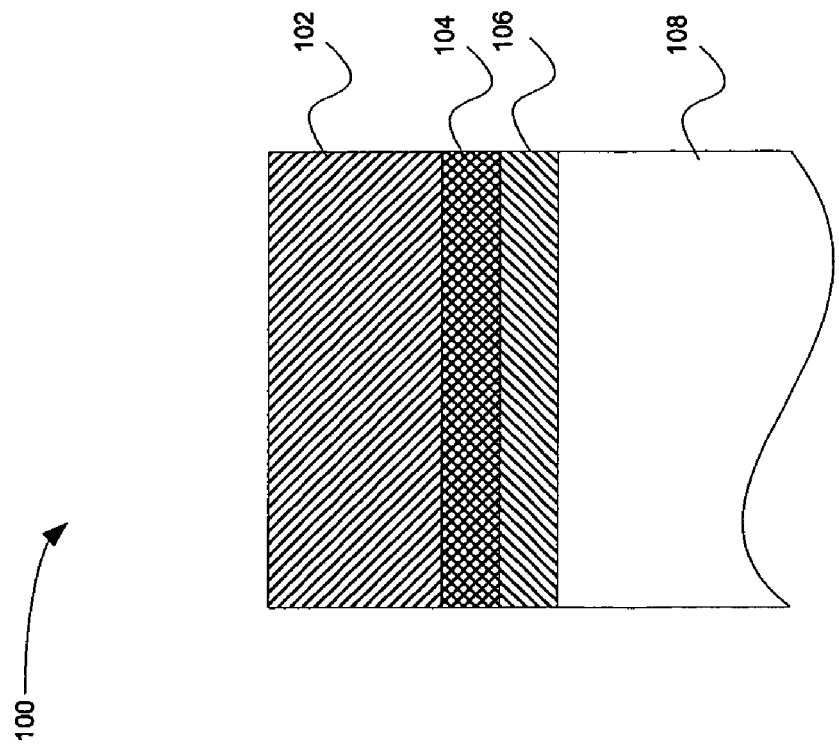

FIGS. 1A-1D illustrate two multi-layer structures and the intensities of different electron signals emitted by the structures when subjected to electron spectroscopy. FIG. 1A illustrates a multi-layer structure 100 having three layers 102, 104, and 106 formed on a substrate 108. Each of the layers 102, 104, and 106, and the substrate 108, emit electrons having a characteristic kinetic energy (KE) when bombarded with energetic particles, such as photons or electrons. FIG. 1B is a graph 110 showing the intensity of an electron species emitted by each layer of the structure 100. FIG. 1C illustrates a multi-layer structure 120 having three layers 122, 124, and 126 formed on a substrate 128. FIG. 1D is a graph 130 showing the intensity of an electron species emitted by each layer of the substrate 120.

Generally, the thickness of a layer in a structure may be determined by generating a ratio of two predictive intensity functions of electron signals. As will be explained below, the predictive intensity functions are dependent on the thickness of a layer that produces the electron. A ratio of two predictive intensity functions is used to allow for variances in the intensity of the beam used to generate the electrons, and other factors that may change the relative intensities of electron signals. Once the ratio including the predictive intensity functions for the emitted electrons is determined, the measured intensities of those electron signals is inputted, and using iteration or other techniques, the thickness of a layer can be determined. Various examples below describe different scenarios for determining thicknesses.

Photoelectron spectroscopy is a technique used to determine the composition and electronic state of a sample. Photoelectron spectroscopy measures photoelectrons that are emitted by a sample that has been bombarded by essentially monochromatic (or of narrow line width) sources of radiation. For example, the sample may be bombarded with x-ray or ultraviolet radiation having a specific, predetermined wavelength. When the individual atoms of the sample absorb the photons of the radiation, the atoms emit an electron having a kinetic energy (KE) characteristic of the atom. This electron is known as a photoelectron. The photon absorbed by the atom has an energy $e=hv$. The photoelectron is an electron that was once bound to the emitting atom. The binding energy (BE) of the photoelectron is the amount of energy required to strip the photoelectron from the atom. The KE measured by the equipment is the amount of energy the photoelectron has after being emitted. Because of the law of conservation of energy, it can be determined that $KE=hv-BE$. As the BE for an electron in an atom has a known value, if the wavelength of the photon striking the sample is known, the KE of an emitted photoelectron can identify the species of the photoelectron.

Auger electron spectroscopy exposes a sample to a beam of electrons having sufficient energy to ionize atoms, thereby causing an atom to emit an Auger electron. When an atom is exposed to the beam, a first electron is removed from a core level of the atom, creating a vacancy. An electron from a higher level of the atom fills the vacancy, causing a release of energy. The released energy is carried off with an ejected Auger electron. The Auger electron, and the intensity of an Auger electron signal can be measured in the same way that the photoelectron signal is measured. It is understood that wherever photoelectrons are mentioned herein, Auger electron species may also be measured and used to determine thicknesses. Additionally, other electron species that have a characteristic energy and whose intensities may be measured may also be used with embodiments of the invention.

The emitted photoelectrons can be counted using an electron energy analyzer. A spectrum plotting the number of photoelectrons counted at specific kinetic energies can be generated from the raw data. The spectrum can then be used to determine various characteristics, such as the composition or the thickness, of the sample. According to one embodiment of the invention, constant-angle (e.g., the x-ray source remains at a constant angle) spectroscopy is used to determine layer thickness.

X-ray photoelectron spectroscopy (XPS) is photoelectron spectroscopy using an x-ray source. Using XPS or similar techniques, one may determine the thickness of the layers 102, 104, 106, 122, 124, or 126. In order to determine the thickness of the layer 102, the structure 100 is bombarded with x-ray wavelength photons from an x-ray source to stimulate the emission of a characteristic photoelectron using the photoelectric effect. When a photon having a specific wavelength is absorbed by an atom in a molecule or solid, a core (inner shell) electron having a specific, characteristic energy for that species is emitted. The kinetic energy of the emitted photoelectrons can be used to determine the thickness and other characteristics of the layer that generated them.

The various layers of the structures 100 and 120 each have corresponding elemental species. For example, the layer 102 and the layer 122 have the same elemental species, the layer 104 and the layer 124 have the same elemental species, and the layer 106 and the layer 126 have the same elemental species. Since the elemental species of the layers 102 and 122 is the same, the layers 102 and 122 will emit photoelectrons having the same characteristic KE. The two structures 100 and 120 are identical except for the thickness of the middle layers of each (i.e., the layers 104 and 124). While the layers 102 and 122 have the same thickness, and the layers 106 and 126 have the same thickness, the layer 104 is thicker than the layer 124. This is significant since the intensity of photoelectrons emitted by buried layers is attenuated by the layers above them.

As shown in FIGS. 1B and 1D, the intensity 112 of the photoelectron signal emitted by the layer 104 is greater than the intensity 132 of photoelectron signal emitted by the layer 124. All of the photoelectrons emitted by the layers 104 and 124 have the same kinetic energy, however, the thicker layer 104 emits more photoelectrons (i.e., has a higher intensity), which indicates that the layer 104 is thicker than the layer 124. Since a predictive intensity function that is dependent on the thickness of the layer can be formulated for each photoelectron species, the measured intensity of the photoelectrons can be used to determine the thickness of the various layers of the structures 100 and 120.

As can be seen in FIGS. 1B and 1D, the intensities 118 and 138 of the signals emitted by the layers 102 and 122 are the same. This is because the layers 118 and 138 have the same thickness, and because the signals emitted by the layers 118 and 138 are not attenuated by an overlayer. The intensity 136 of the signal emitted by the substrate 128 is greater than the intensity 116 of the signal emitted by the substrate 108. This is because the signal emitted by the substrate 108 is more attenuated than the signal emitted by the substrate 128. The substrates 108 and 128 are considered to be infinitely thick (i.e., they have a thickness greater than four times the wavelength of the incoming photons) and will therefore produce approximately the same number of characteristic photoelectrons under the same conditions. The thicker layer 104 attenuates the signal emitted by the substrate 108 more than the thinner layer 124 attenuates the signal emitted by the substrate 128. For the same reason, even though the layers 106 and 126 have the same thickness, the intensity 114 of the signal emitted by the layer 106 is less than the intensity 134 of the signal emitted by the layer 126. The intensity 112 of the signal emitted by the layer 104 is greater than the intensity 132 of the signal emitted by the layer 124 since the layer 104 is thicker than the layer 124, and a thicker layer emits more photoelectrons.

Figure 2A:
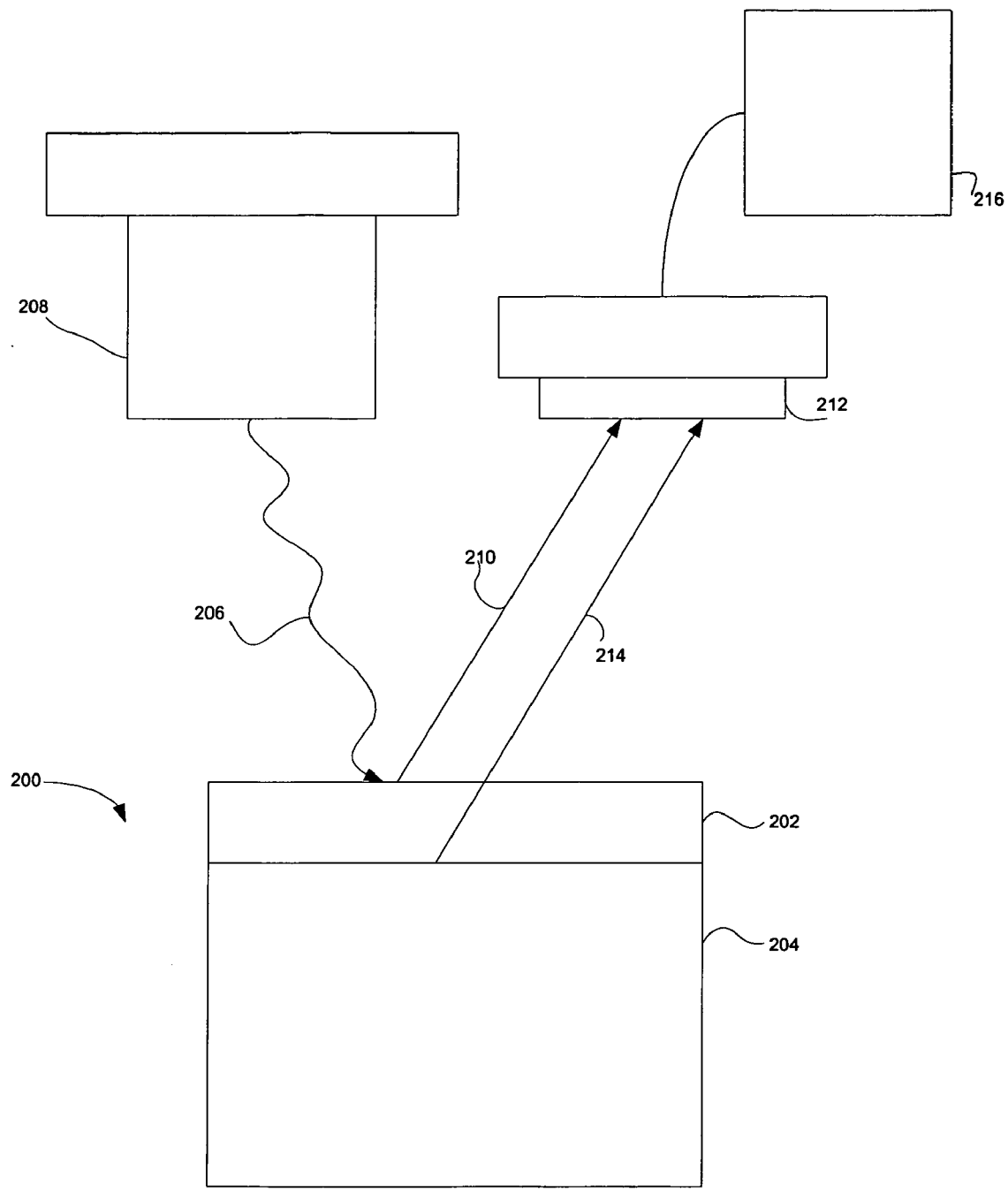
FIG. 2A illustrates a layered structure formed on a substrate according to one embodiment of the invention.

FIG. 2A illustrates a layered structure formed on a substrate according to one embodiment of the invention. The discussion regarding FIG. 2A discusses a general formulation of a ratio used to determine a thickness of a layer. FIG. 2A shows a structure 200 including a layer 202 formed on a silicon or other substrate 204 which may represent a portion of a larger micro-electronic device. The thickness of the layer 202 may be measured using X-Ray Photoelectron Spectroscopy (XPS) or similar techniques, such as Ultraviolet Photoelectron Spectroscopy (UPS), Auger spectroscopy, etc.

Figure 2B:
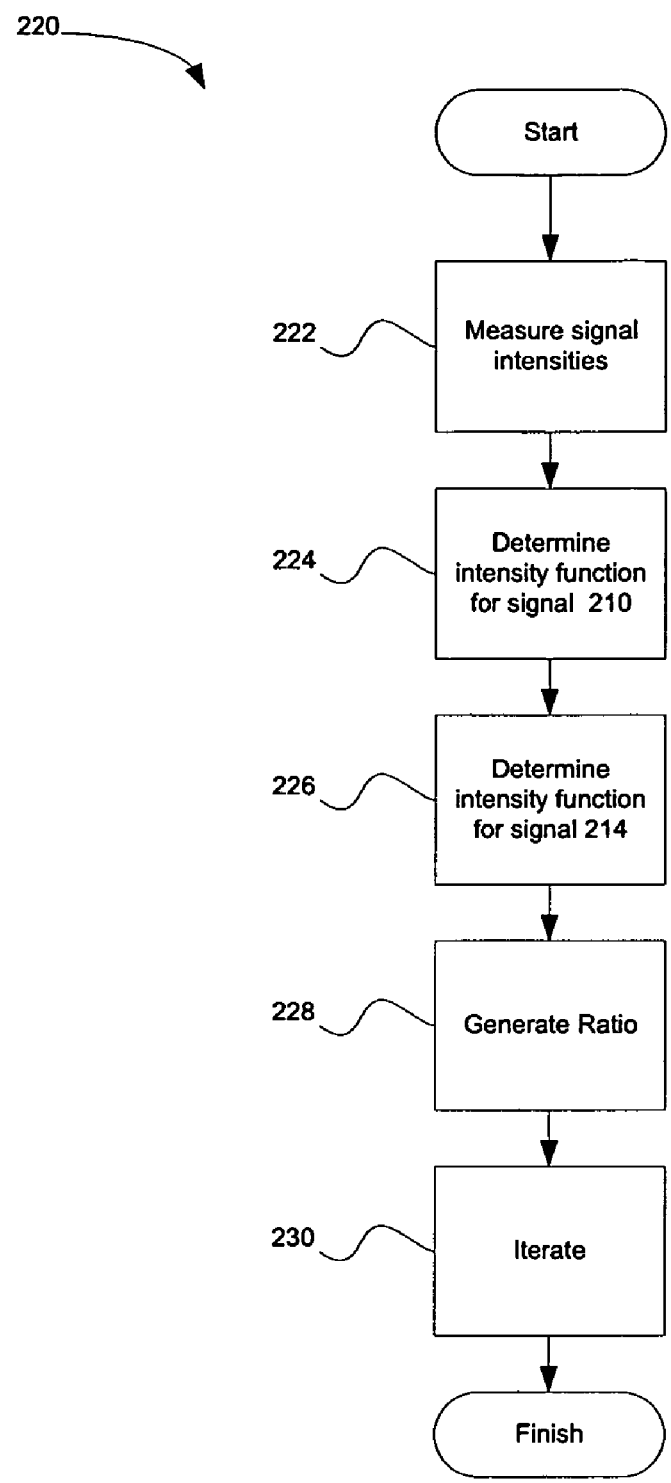
FIG. 2B is a flowchart describing a process for determining a thickness of a single layer over a substrate.
Figure 2C:
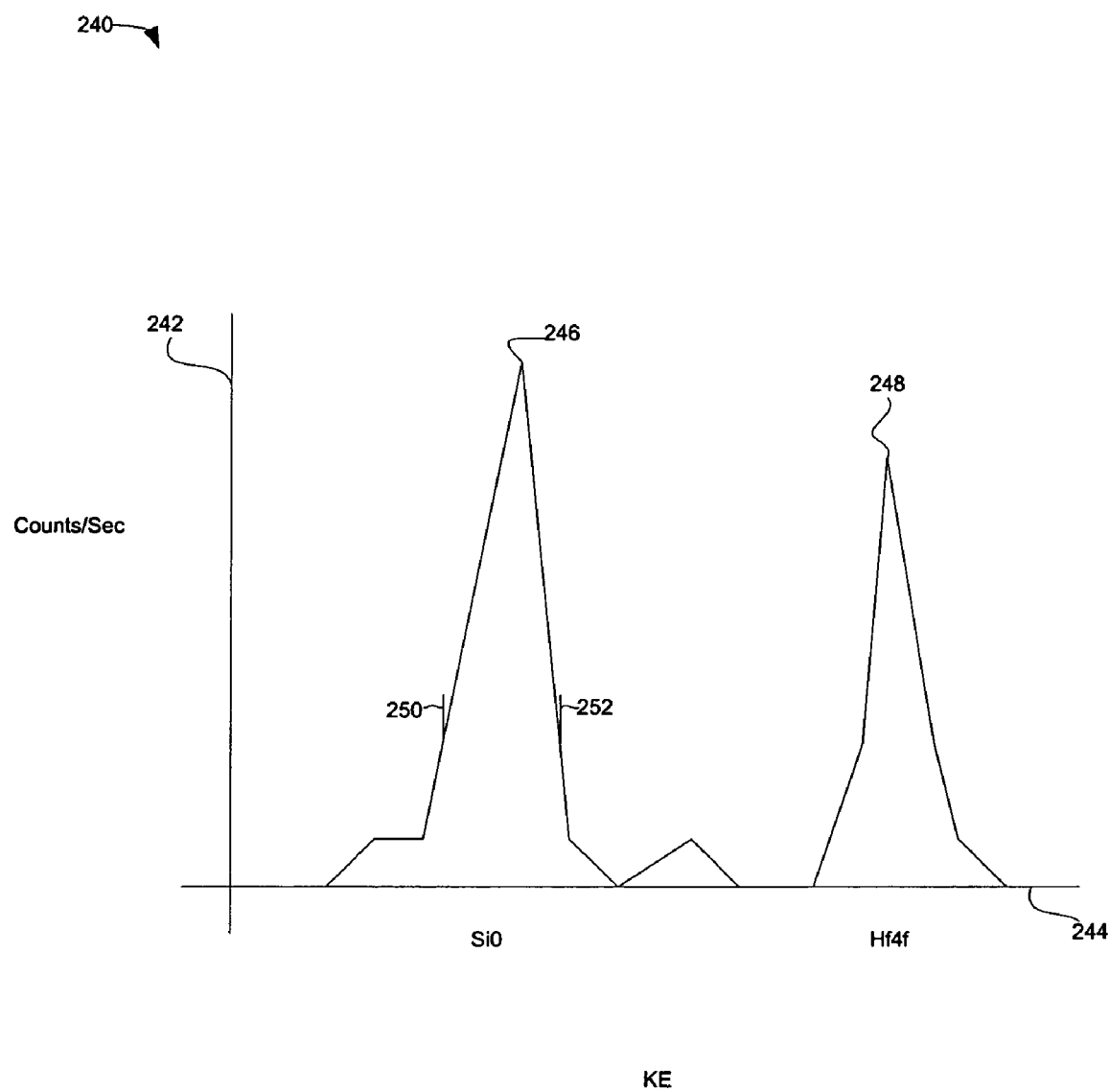
FIG. 2C illustrates a spectrum of the measured results generated by XPS spectroscopy.
Figure 3A:
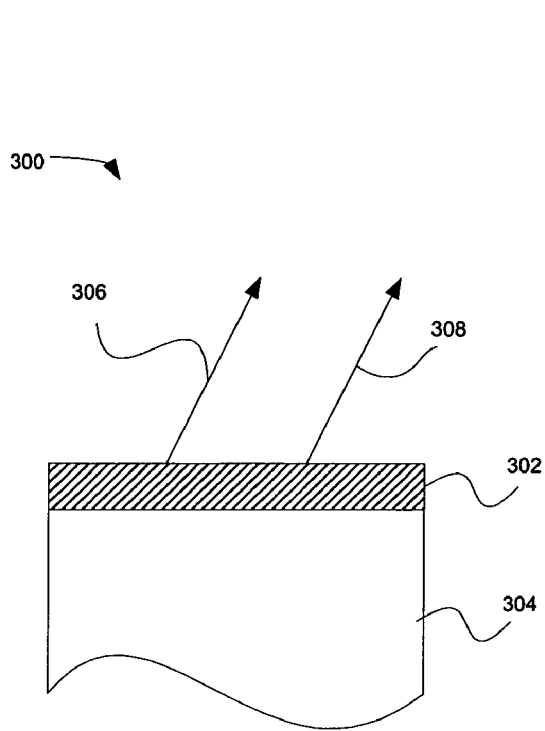
FIG. 3A illustrates a single layer over a substrate.
Figure 3B:
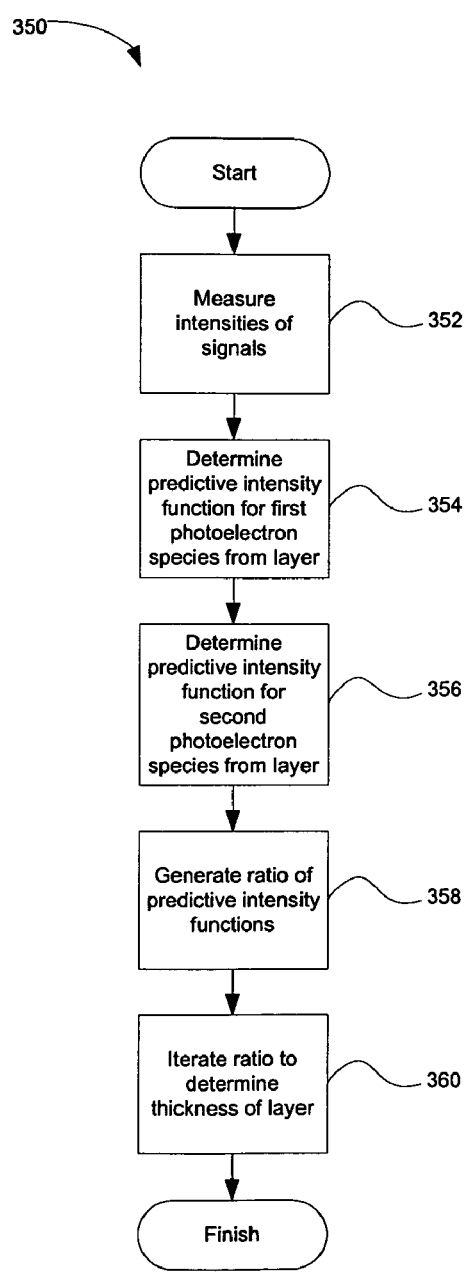
FIG. 3B is a flowchart describing a process for determining a thickness of a single layer over a substrate.

FIG. 2B is a flowchart describing a process for determining a thickness of a single layer over a substrate. The process 220 uses two electron signals (one from the layer 202 and one from the substrate 204) to determine the thickness of the layer 202. The intensities of the two electron signals are first measured. Predictive intensity functions dependent on the thickness of the layer 202 are determined. A ratio of the two functions (one predicting the intensity of the signal from the layer 202, the other predicting the intensity of the signal from the substrate 204) is generated, and the thickness of the layer 202 is extracted from the ratio. This will be explained in more detail below. FIGS. 2A-C describe a process for determining a thickness of a single layer over a substrate using an electron signal from the layer and an electron signal from the substrate. FIGS. 3A and 3B illustrate an alternate process for determining a thickness of a layer over a substrate using two electron signals from the layer. Alternatively, using these techniques, the thickness of the layer may also be determined using two electron signals from the substrate.

The structure 200 includes the substrate 204 that forms the basis for the structure 200 and may be formed from single-crystal silicon. The layer 202 is formed over the substrate 204. The layer 202 in this example may be a Hafnium Oxide ($HfO_2$) layer. Although specific examples of layer species are used here, it is understood that any layer material may be used with embodiments of this invention.

According to one embodiment, the thickness of the layer 202 can be determined by taking a ratio of the intensities of two measured signals of photoelectrons emitted by the layer 202 and the substrate 204. A hafnium atom, when bombarded with x-ray wavelength photons 206 generated by an x-ray source 208, emits a characteristics photoelectron signal 210 comprising photoelectrons (for example) from the 4f orbital. The x-ray source 208 may include, for example, an electron gun to direct electrons at an anode to generate x-ray photons, and a lens to focus the x-ray photons on the structure 200. The photoelectrons comprising the signal 210 have a characteristic kinetic energy that is measured and counted by an electron energy analyzer 212. The substrate 202 also emits a characteristic signal 214 comprising photoelectrons emitted by the Si2p shell and influenced by the Si—Si bond (the "Si0" photoelectron). The signal 214 is also measured by the analyzer 212. One or both of the signals 210 or 214 may also comprise Auger electrons or other ejected characteristic energy electrons. For example, the signal 210 may be an Auger electron signal, while the signal 214 is the Si0 photoelectron signal.

The analyzer 212 returns the measured results to a processing system 216. The processing system 216 may be a personal computer (PC) such as those having Intel® processors, and may interface with the analyzer 212 through a universal serial bus (USB) connection. The measured results are processed by the processing system 216 and returned to a user.

FIG. 2C illustrates a spectrum 240 of the measured results generated by XPS spectroscopy. The spectrum 240 shows a number of counts per second measured along the y-axis 242, and a kinetic energy (KE) of the measured-photoelectrons along the x-axis 244. The spectrum 240 shows two peaks, 246 and 248, corresponding to the measured signals 212 and 210, respectively. The number of counts as shown in the peaks 246 and 248 is used to determine the intensity of the signals 210 and 212. The peak 246 may have a lower bound 250 and an upper bound 252. The number of counts falling between these bounds determine the intensity of the Si0 species (i.e., more counts equals higher intensity), which is then used to determine the thickness of the layer 202. The peaks 246 and 248 may also be manipulated (e.g., shaped or fitted) or have background noise removed using standard techniques such as background subtractions.

The intensities of photoelectrons characteristic to a layer (e.g., the layer 202) can be predicted using formulae that depend on the layer thickness and the attenuation of the signals in a film for a given electron analyzer geometry, x-ray source to analyzer angle, operating condition, and x-ray flux of given energy. The process 220 shown in FIG. 2B described determining layer thickness using an electron species from the layer 202 and an electron species from the substrate 204. In block 222, the intensities of the two electron signals 210 and 214 are measured using the analyzer 212 shown above. In block 224, a predictive intensity function for the signal 210 is determined. Equation (1) can be used to determine the intensity of a signal that is not attenuated (i.e., a signal emitted by the top layer of a structure):

$$I(X_i) = I_{infXi} \cdot \left[1 - e^{\left(\frac{-t_x}{X_{Xi(X)}}\right)}\right] \quad (1)$$

Where X is an elemental species, $X_i$ is the photoelectron species emitted by the species X which is being measured, $I(X_i)$ is the intensity of the photoelectron signal, $I_{infXi}$ is the intensity of a photoelectron signal emitted by a thick (i.e., greater than 10 nanometers (nm)) layer, $t_x$ is the thickness of the layer emitting the signal, and $\lambda_{Xi(X)}$ is the electron attenuation length (EAL) of the photoelectron species ($X_i$) in a substrate X. An EAL is a measured quantity equal to the distance over which a photoelectron's original intensity drops to 1/e. EALs may be determined using, for example, the National Institute of Science and Technology's (NIST) EAL program. For example, the intensity of the signal 210 emitted by the layer 202 can be predicted using equation (1).

In block 224, a predictive intensity function for the signal 214 is determined. The intensity of the signal 214 emitted by the substrate (or under layer) 204 of thickness $t_x$ is attenuated by the layer 202, and therefore may be predicted using equation (2):

$$I(X) = I_{infX} \cdot \left[1 - e^{\left(\frac{-t_x}{\lambda_{X(X)}}\right)}\right] \cdot e^{\frac{-t_y}{\lambda_{X(Y)}}} \tag{2}$$

Where I(X) is the intensity of a photoelectron signal comprising a photoelectron species X and attenuated by an overlayer Y of thickness $t_y$, $\lambda_{X(Y)}$ is the EAL of photoelectrons emitted by the species X in the layer Y, and $\lambda_{X(X)}$ is the EAL of photoelectrons emitted by the species X in the layer X.

In order to determine the thickness of the layer 202, the ratio of the intensities of the two signals 210 and 214 is determined in block 228. A ratio is used because the specific intensities measured by the analyzer 212 change from measurement to measurement and depend on the x-ray wavelength used and other factors. The ratio of the intensities of the signals 210 and 214 may be given, for example, by equation (3):

$$\frac{I(Si0)}{I(Hf4f)} = \frac{I_{infSi} \cdot e^{\frac{-t_{Hf}}{\lambda_{Si(HfO2)}}}}{I_{infHf} \cdot \left(1 - e^{\frac{-t_{Hf}}{\lambda_{Hf(HfO2)}}}\right)} \tag{3}$$

Equation (3) may be solved iteratively to determine the thickness $t_{Hf}$ using a program such as Matlab® in block 230. I(Hf4f) is the measured intensity of photoelectrons emitted by the 4f shell of hafnium (i.e., the signal 210 and the peak 228), while I(Si0) is the measured intensity of photoelectrons emitted by the substrate 202. $I_{(infHf)}$ and $I_{(infSi)}$ are the measured intensities of a photoelectron emitted by a thick (e.g., greater than 10 nm) layer of hafnium oxide and silicon, respectively. $\lambda_{Si(HfO2)}$ and $\lambda_{Hf(HfO2)}$ are the measured electron attenuation lengths (EALs) of silicon and hafnium photoelectrons emitted by the substrate 204 and the layer 202. The intensity of the silicon signal 214 is attenuated by the layer 204.

FIG. 3A illustrates a single layer over a substrate. FIG. 3B is a flowchart describing a process for determining a thickness of a single layer over a substrate. The process 350 describes the formulation of an algorithm used to determine a thickness of a layer 302 over a substrate 304. The process 350 describes determining the thickness using two photoelectron species emitted by the layer 302. After the algorithm has been formulated, the thickness of the layer 302 may be determined using any known technique, such as calculating the thickness using Matlab® or other suitable mathematical software.

The structure 300 emits two photoelectron signals 306 and 308 from the layer 302. The signals 306 and 308 may be emitted by the same elemental species (e.g., the signal 306 may be from the 4p orbital of hafnium and the signal 308 may be from the 4f orbital of hafnium), or may be emitted by different elemental species in the same layer (e.g., the signal 306 may be emitted by the 4f orbital of hafnium, and the signal 308 may be emitted by the 2p orbital of oxygen). In the most general sense, using this technique, two signals 306 and 308 emitted by the layer 302 are measured. Predictive intensity functions for the two signals 306 and 308 are formulated, and a ratio of the two is generated. Since the signals 306 and 308 are both emitted from the layer 302, which is the top layer, the signals are not attenuated by overlayers. The predictive intensity functions therefore take the form of equation (1). Once the ratio has been formulated, the thickness can be extracted using iteration or other techniques.

The layer 302, in this example, comprises hafnium oxide ($HfO_2$). However, it is understood that the layer 302 may comprise other elemental species, such as aluminum oxide ($Al_2O_3$), titanium nitride (TiN), etc. The process 350 measures the signals 306 and 308 of two photoelectron species emitted by the layer 302 during photoelectron spectroscopy: photoelectrons emitted by the 4f orbital of hafnium (the "Hf4f" photoelectron species) and photoelectrons emitted by the 4p orbital of hafnium (the "Hf4p" photoelectron species). It is understood that other photoelectron species (e.g., the Hf4d photoelectron species) may also be used to determine the thickness of the layer 302.

In block 352, the intensities of the Hf4f and Hf4p photoelectron signals are measured using a photoelectron spectroscopy process as described above. In blocks 354-360, equations are determined and a ratio is created to determine the thickness of the layer 302.

In the equations below, the thickness of the layer 302 is given as $t_{HfO2}$, the EAL of the Hf4f photoelectron species is given as $\lambda_{Hf4f(1)}$, the EAL of the Hf4p photoelectron species is given as $\lambda_{Hf4p(1)}$, and the intensity of photoelectrons emitted from a thick (e.g., thicker than 10 nm) layer is given by $I_{infHf4f}$ and $I_{infHf4p}$ (for the Hf4f and Hf4p photoelectron species, respectively). The measured intensity of the signal of the Hf4f photoelectron species is I(Hf4f) and the measured intensity of the signal of the Hf4p species is I(Hf4p).

In block 354 a predictive intensity function for the first (e.g., Hf4f) photoelectron species from the layer 302 is determined. The layer 302 is the top layer of the structure 300, and photoelectrons emitted by the layer 302 are not attenuated by any overlayers. As a result, the equations used to predict the intensity of photoelectrons emitted by the layer 302 are of the form of the equation (1), above. A predictive intensity function for the Hf4f species is given by equation (4):

$$I(Hf4f) = I_{infHf4f} \cdot \left[1 - e^{\left(\frac{-t_{HfO2}}{\lambda_{Hf4f(1)}}\right)}\right] \tag{4}$$

In block 356, a predictive intensity function for the second (e.g., Hf4p) photoelectron species from the layer 302 is determined. A predictive intensity function for the Hf4p species is given by equation (5):

$$I(Hf4p) = I_{infHf4} \cdot \left[1 - e^{\left(\frac{-t_{HfO2}}{\lambda_{Hf4p(1)}}\right)}\right] \tag{5}$$

In block 358, a ratio of the two predictive intensity functions is generated. The ratio of equations (4) and (5) may be used to determine the thickness $t_{HfO2}$ of the layer 302 and is shown in equation (6):

$$\frac{I(Hf4p)}{I(Hf4f)} = \frac{I_{infHf4p} \cdot \left[1 - e^{\left(\frac{-t_{HfO2}}{\lambda_{Hf4p(1)}}\right)}\right]}{I_{infHf4f} \cdot \left[1 - e^{\left(\frac{-t_{HfO2}}{\lambda_{Hf4f(1)}}\right)}\right]} \tag{6}$$

In block 360, the ratio shown in equation (6) is iterated to determine the thickness $t_{HfO2}$ of the layer 302.

FIG. 4A illustrates a two-layer structure 400 including a silicon dioxide layer. FIG. 4B is a flowchart describing a process 450 for determining a thickness of a top layer of the structure 400. The structure 400 includes a top layer 402, a silicon dioxide layer 404, and a substrate 406. In this process 450, the thickness of the silicon dioxide layer 404 is first determined, and a ratio of photoelectrons emitted by the top layer 402 and photoelectrons emitted by the substrate 406 and attenuated by the silicon dioxide layer 404 and the top layer 402.

The technique described with regards to FIGS. 4A and 4B can be used to determine the thickness of a layer in structure including a top layer of any composition, over a layer including an oxide of silicon (e.g., silicon dioxide or silicon bound to oxygen and nitrogen (SiON)), which is over a substrate. The thickness of the layer of the oxide of silicon is then determined using known techniques. To determine the thickness of the top layer, a first predictive intensity function of a signal emitted by the top layer is first determined. Then, a second predictive intensity function of either a signal emitted by the substrate or a signal emitted by the layer of the oxide of silicon is determined. The second predictive intensity function includes an attenuation factor to account for the overlayers, and is of the form of equation (2). A ratio of the two predictive intensity functions is generated, and the thickness is determined using the ratio.

The following photoelectron species may be measured to determine the thickness of the layers 402 and 404. It is understood that other photoelectron species may also be used. The top layer 402 may comprise, for example, hafnium oxide. The photoelectron signal 408 measured here is of (for example) the Hf4f species. The photoelectron signal 410 measured from the silicon dioxide layer 404 (the "Si4+" species) is from the 2p orbital of the silicon atom and is influenced by the silicon-oxygen bond in the silicon dioxide layer 404. The photoelectron signal 412 emitted by the substrate 406 (the "Si0" species) is emitted from the 2p orbital of the silicon atom and is influenced by the silicon-silicon bond in the substrate 406. Constant-angle XPS is sensitive enough to differentiate between the Si4+ and Si0 photoelectron species, unlike previous techniques for determining layer thickness. Hereinafter, wherever a silicon dioxide layer is described, it is understood that other oxides of silicon (e.g., silicon bound to oxygen and nitrogen (SiON)) may be substituted for the silicon dioxide layers.

In block 452, a measured intensity of the Hf4f signal 408, the Si4+ signal 410, and the Si0 signal 412 are determined using a process and equipment similar to those described above.

In the equations below, the thickness of the layer 402 is given as $t_{HfO2}$, the thickness of the silicon dioxide layer 404 is given as $t_{SiO2}$, the EAL of the Hf4f photoelectron species is given as $\lambda_{Hf4f(HfO2)}$, the EAL of the Si4+ photoelectron species is given as $\lambda_{Si2p(HfO2)}$ in $HfO_2$ and $\lambda_{Si2p(SiO_2)}$ in $SiO_2$. The intensity of photoelectrons emitted from a thick (e.g., thicker than 10 nm) layer is given by $I_{infHf4f}$ and $I_{infSi4+}$ (for the Hf4f and Si2p photoelectron species, respectively). The measured intensity of the signal 408 of the Hf4f photoelectron species is I(Hf4f) and the measured intensity of the signal 410 of the Si2p species is I(Si2p).

In block 454, the thickness of the silicon dioxide layer 404 is determined. The thickness of the silicon dioxide layer is determined using the following equation (7):

$$t_{SiO2} = \sin(\alpha) \ln[(I(Si0)/I(Si4+))*k+1] \quad (7)$$

where $\alpha$=an angle of the analyzer 212 relative to the surface of the structure 400, and k is the bulk material intensity (a constant that is dependent on the material used). The equation (7) is a known equation for determining a thickness of a silicon dioxide layer within a structure.

In block 456, a predictive intensity function of the Si0 signal 412 emitted by the substrate 406 is determined. Since the signal 412 emitted by the substrate 406 is attenuated by the layers 404 and 402, the predictive intensity function (shown in equation (8)) is of the form of the equation (2):

$$I(Si0) = I_{infSi} \cdot e^{\frac{-t_{HfO2}}{\lambda_{Si(HfO2)}}} \cdot e^{\frac{-t_{SiO2}}{\lambda_{Si(SiO2)}}} \quad (8)$$

Since the signal is attenuated through two layers, two attenuation factors (one for the hafnium oxide layer 402 and one for the silicon dioxide layer 404) are used.

In block 458, a predictive intensity function for a signal 408 of the Hf4f photoelectron species emitted by the layer 402 is determined. The layer 402 is the top layer of the structure 400, and therefore the equation (9) is of the form of the equation (1):

$$I(Hf4f) = I_{infHf} \cdot \left[1 - e^{\left(\frac{-t_{HfO2}}{\lambda_{Hf4f(1)}}\right)}\right] \quad (9)$$

In block 460, a ratio of the equations (8) and (9) is generated, as show in equation (10):

$$\frac{I(Si0)}{I(Hf4f)} = \frac{I_{infSi} e^{\frac{-t_{HfO2}}{\lambda_{Si(HfO2)}}} \cdot e^{\frac{-t_{SiO2}}{\lambda_{Si(SiO2)}}}}{I_{infHf} \cdot \left(1 - e^{\frac{-t_{HfO2}}{\lambda_{Hf(HfO2)}}}\right)} \quad (10)$$

In block 462, the equation (10) is iterated to determine the thickness of the layer 402.

FIG. 5A illustrates a three-layer structure 500 including a layer of silicon dioxide. FIG. 5B is a flowchart describing a process 550 for determining a thickness of two of the layers of the structure 500. The structure 500 includes a top layer 502, a middle layer 504, a silicon dioxide layer 506, and a substrate 508. The process 550 may be used to determine a thickness of the layers 502, 504, and 506 if the top layer 502 has two characteristic photoelectron species. The layer 502 may comprise, for example, aluminum oxide, and the layer 504 may comprise hafnium oxide. Using the process 550, two photoelectron signals 510 and 512 from the top layer 502 (e.g., an Al2s photoelectron signal 510 and an Al2p photoelectron signal 512), one photoelectron signal 514 from the middle layer 504 (e.g., an Hf4f photoelectron species), an Si4+ signal 516 from the silicon dioxide layer 506, and an Si0 signal 518 from the substrate 508 are measured.

Generally the process 550 may be used to determine the thickness of layers arranged in a structure including a substrate, a layer of an oxide of silicon over the substrate, and two other layers over the layer of the oxide of silicon. Two electron species from the top layer are used, one from the middle layer, one from the layer of the oxide of silicon, and one from the substrate. The thickness of the top layer is determined using two signals as described above in the process 350. The thickness of the layer of the oxide of silicon is determined using the equation (7), above. The thickness of the middle layer is determined by generating a ratio including a predictive intensity function of the signal from the middle layer, and another predictive intensity functions (e.g., of one of the signals from the top layer). The thickness is then determined using the ratio.

In block 552, the various signals 510-518 described above are measured. In block 554, the thickness of the silicon dioxide layer 506 is determined. The thickness of the silicon dioxide layer 506 may be determined using the equation (7), shown above.

In the equations below, the thickness of the layer 502 is given as $t_{Al}$, the thickness of the layer 504 is given as $t_{HfO2}$, the EAL of the Al2s photoelectron species is given as $\lambda_{Al2s(Al)}$, the EAL of the Al2p photoelectron species is given as $\lambda_{Al2p(Al)}$, the EAL of the Hf4f photoelectron species is given as $\lambda_{Hf4f(HfO2)}$, and the intensity of photoelectrons emitted from a thick (e.g., thicker than 10 nm) layer is given by $I_{infAl2s}$, $I_{infAl2p}$, and $I_{infHf4f}$ (for the Al2s, Al2p, and Hf4f photoelectron species, respectively). The measured intensity of the signal of the Al2s photoelectron species is I(Al2s), the measured intensity of the signal of the Al2p photoelectron species is I(Al2p), and the measured intensity of the Hf4f photoelectron species is I(Hf4f).

In block 556, a thickness of the top layer 502 is determined. The thickness of the top layer 502 may be determined using two photoelectron signals 510 and 512 (e.g., the Al2s and Al2p signals described above) using techniques shown in FIG. 3B. The thickness of the top layer 502 may be determined by iteration of the ratio given in equation (11):

$$\frac{I(Al2s)}{I(Al2p)} = \frac{I_{infAl2s} \cdot \left[1 - e^{\left(\frac{-t_{Al}}{\lambda_{Al2s(Al)}}\right)}\right]}{I_{infHf4f} \cdot \left[1 - e^{\left(\frac{-t_{Al}}{\lambda_{Al2p(Al)}}\right)}\right]} \quad (11)$$

In block 558, a predictive intensity function for the middle layer 504 is determined. The predictive intensity function is of the form of the equation (2) since the photoelectron signal 514 emitted by the middle layer 504 are attenuated by the top layer 502. The predictive intensity function is given in equation (12):

$$I(Hf4f) = I_{infHf4f} \cdot e^{\frac{-t_{Al}}{\lambda_{Hf4f(Al)}}} \cdot \left(1 - e^{\frac{-t_{HfO2}}{\lambda_{Hf4f(HfO2)}}}\right) \quad (12)$$

In block 560, a ratio is generated. The ratio may be taken between predictive intensity functions of one of the photoelectron signals 510 or 512 of the top layer 502 and the photoelectron signal 514 of the middle layer 504 as shown in equation (12). Here, the intensity function of the Al2p photoelectron species (see equation (11)) is used to generate the ratio in equation (13):

$$\frac{I(Al2p)}{I(Hf4f)} = \frac{I_{infAl2p} \cdot \left(1 - e^{\frac{-t_{Al}}{\lambda_{Al2p(Al)}}}\right)}{I_{infHf} \left(1 - e^{\frac{-t_{HF}}{\lambda_{Hf(HfO2)}}}\right) \cdot e^{\frac{-t_{Al}}{\lambda_{Hf4f(Al)}}}} \quad (13)$$

In block 562, the ratio shown in equation (13) is iterated to determine a thickness of the middle layer 504.

Figure 6:
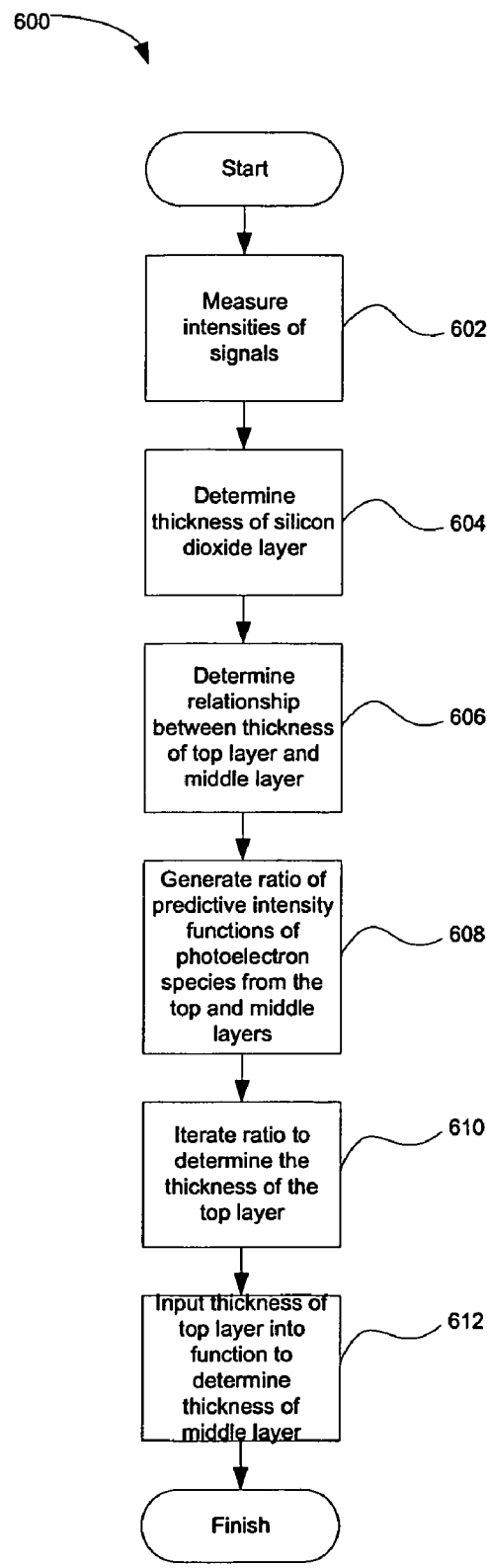
FIG. 6 is a flowchart describing an alternative process for determining the thicknesses of the three layers of the three-layer structure.

FIG. 6 is a flowchart describing an alternative process 600 for determining the thicknesses of the layers 502, 504, and 506 of the structure 500. The process 600 may be used when the top layer 502 has only one distinctive photoelectron species. For example, the top layer 502 may comprise boron, and emit a photoelectron species (e.g., the signal 510) from the 1s shell (the "B1s" species). The middle layer 504 may comprise hafnium oxide, and emit the Hf4f photoelectron species (e.g., the signal 514). The silicon dioxide (or SiON) layer 506 may emit the Si4+ photoelectron signal 516, and the substrate 508 emits two signals: one from the 2p shell (i.e., the Si2p0 photoelectron signal 518) and one from the 2s shell (the Si2s0 photoelectron signal 520). It should be noted that in the absence of two distinct photoelectron signals for a given species, ratios of photoelectron and Auger electron signals corresponding to this species may be used as well.

The process 600 generally describes using only one of the signals 510 or 512 to determine the thickness of the layers 502-506. Using the process 600, a functional relationship between the two top layers 502 and 504 is determined. This ratio may be in terms of a ratio of predictive intensity functions of signals generated below the top layers 502 and 504 (e.g., signals emitted by the substrate 508). Another ratio may be generated between intensity functions of signals of the top and middle layers 502 and 504. This functional relationship is then substituted into the ratio so that the thickness of one of the layers may be solved.

In block 602, intensities of the signals 510 and 514-520 resulting from the emission of the above photoelectrons species are measured. In block 604, the thickness $t_{SiO2}$ of the silicon dioxide layer 506 is determined using the equation (7).

In block 606, a relationship between the thickness of the top layer 502 and the middle layer 504 is determined. This relationship may be expressed in terms of an intensity ratio between the predictive intensity functions of the Si2s0 photoelectron signal 518 and the Si2p0 photoelectron signal 520 emitted by the substrate 508. This ratio is shown in equation (14):

$$\frac{I(Si2s0)}{I(Si2p0)} = \frac{I_{infSi2s0}}{I_{infSi2p0}} \cdot \frac{e^{\frac{-t_{SiO2}}{\lambda_{Si2s0(SiO2)}}} \cdot e^{\frac{-t_2}{\lambda_{Si2s0(2)}}} \cdot e^{\frac{-t_1}{\lambda_{Si2s0(1)}}}}{e^{\frac{-t_{SiO2}}{\lambda_{Si2p0(SiO2)}}} \cdot e^{\frac{-t_2}{\lambda_{Si2p0(2)}}} \cdot e^{\frac{-t_1}{\lambda_{Si2p0(1)}}}} \quad (14)$$

where $t_1$ is the thickness of the top layer 502, and $t_2$ is the thickness of the middle layer 504. Since $t_{SiO2}$ was determined in block 604, equation (14) can be rewritten as equation (15):

$$\frac{I(Si2s0)}{I(Si2p0)} = C_1 \cdot \frac{e^{\frac{-t_2}{\lambda_{Si2s0(2)}}} \cdot e^{\frac{-t_1}{\lambda_{Si2s0(1)}}}}{e^{\frac{-t_2}{\lambda_{Si2p0(2)}}} \cdot e^{\frac{-t_1}{\lambda_{Si2p0(1)}}}} \quad (15)$$

where $C_1$ is a known constant given in equation (16):

$$C_1 = \frac{I_{infSi2s0}}{I_{infSi2p0}} \cdot \frac{e^{\frac{-t_{SiO2}}{\lambda_{Si2s0(SiO2)}}}}{e^{\frac{-t_{SiO2}}{\lambda_{Si2p0(SiO2)}}}} \quad (16)$$

The natural logarithm of equation (15) can be taken to express $t_2$ in terms of $t_1$, as shown in equation (17):

$$\ln\left(\frac{I(Si2s0)}{I(Si2p0)} \cdot \frac{1}{C_1}\right) -$$

$$t_2 = \frac{\begin{array}{c}-t_1 \cdot \lambda_{Si2s0(2)} \cdot \lambda_{Si2p0(2)} \cdot \lambda_{Si2p0(1)} + \\ t_1 \cdot \lambda_{Si2s0(2)} \cdot \lambda_{Si2s0(1)} \cdot \lambda_{Si2p0(2)} \\ \hline \lambda_{Si2s0(2)} \cdot \lambda_{Si2s0(1)} \cdot \lambda_{Si2p0(2)} \cdot \lambda_{Si2p0(1)}\end{array}}{\begin{array}{c}-\lambda_{Si2s0(1)} \cdot \lambda_{Si2p0(2)} \cdot \lambda_{Si2p0(1)} + \\ \lambda_{Si2s0(2)} \cdot \lambda_{Si2s0(1)} \cdot \lambda_{Si2p0(1)} \\ \hline \lambda_{Si2s0(2)} \cdot \lambda_{Si2s0(1)} \cdot \lambda_{Si2p0(2)} \cdot \lambda_{Si2p0(1)}\end{array}} \quad (17)$$

For simplicity, equation (17) will hereinafter be written as $t_2 = f(t_1)$.

In block 608, a ratio of the predictive intensity functions of the photoelectron signal 510 emitted by the top layer 502 (i.e., the B1s photoelectron species) and the signal 514 emitted by the middle layer 504 (i.e., the Hf4f photoelectron species) is generated, as shown in equation (18):

$$\frac{I(B1s)}{I(Hf4f)} = \frac{I_{infB1s} \cdot \left(1 - e^{\frac{-t_1}{\lambda_{B1s(B)}}}\right)}{I_{infHf} \cdot \left(1 - e^{\frac{-t_{Hf}}{\lambda_{Hf(HfO2)}}}\right) \cdot e^{\frac{t_1}{\lambda_{Hf4f(B)}}}} \quad (18)$$

Substituting $f(t_1)$ for $t_2$ gives equation (19):

$$\frac{I(B1s)}{I(Hf4f)} = \frac{I_{infB1s} \cdot \left(1 - e^{\frac{-t_1}{\lambda_{B1s(B)}}}\right)}{I_{infHf} \cdot \left(1 - e^{\frac{-f(t_1)}{\lambda_{Hf(HfO2)}}}\right) \cdot e^{\frac{t_1}{\lambda_{Hf4f(B)}}}} \quad (19)$$

$t_1$ can be uniquely determined by iterating equation (19) in block 610. $t_2$ can then be determining by inputting the value of $t_1$ into the equation (17) in block 612.

FIG. 7A illustrates a structure 700 including two silicon dioxide layers. FIG. 7B is a flowchart describing a process 750 for determining a thickness of a layer between the two silicon dioxide layers. The structure 700 includes a top silicon dioxide layer 702, a middle layer 704, and a bottom silicon dioxide layer 706 on a substrate 708. The middle layer 704 may be any appropriate elemental species, such as hafnium oxide. The middle layer 704 emits two photoelectron signals, for example a Hf4f signal 710 and a Hf4p signal 712. Two photoelectron signals, an Si2p0 signal 714 and an Si2s0 signal 716 are emitted by the substrate 708.

Generally, the process 750 describes determining layer thickness in a structure including a layer sandwiched by two silicon oxide layers. Two signals are used from each of the "sandwiched" layer and from the substrate. A functional relationship between the thickness of the middle layer and the total thickness of all of the silicon oxide layers is determined. The functional relationship is then substituted into intensity ratios to determine the various thicknesses.

In block 752, the intensities of the photoelectron species described above are measured. In block 754, a functional relationship between the sum of the thickness of the two silicon dioxide layers 702 and 706 and the thickness of the middle layer 704 is determined to give $t_{layer2} = f(t_{layer1} + t_{layer3})$. This relationship can be determined from a ratio of the predictive intensity functions of the Si2s0 and Si2p0 photoelectron species as shown in equation (20):

$$\frac{I(Si2s0)}{I(Si2p0)} = \frac{I_{infSi2s0}}{I_{infSi2p0}} \cdot \frac{e^{\frac{-t_{SiO2}}{\lambda_{Si2s0(SiO2)}}} \cdot e^{\frac{-t_2}{\lambda_{Si2s0(2)}}} \cdot e^{\frac{-t_{3SiO2}}{\lambda_{Si2s0(SiO2)}}}}{e^{\frac{-t_{1SiO2}}{\lambda_{Si2p0(SiO2)}}} \cdot e^{\frac{-t_2}{\lambda_{Si2p0(2)}}} \cdot e^{\frac{-t_{3SiO2}}{\lambda_{Si2p0(SiO2)}}}} \quad (20)$$

where $t_{1SiO2}$ is the thickness of the top silicon dioxide layer 702, $t_2$ is the thickness of the middle layer 704, and $t_{3SiO2}$ is the thickness of the bottom silicon dioxide layer 706.

Equation (20) can be rewritten as equation (21) by determining the natural logarithm of equation (20):

$$\ln\left[\frac{I(Si2s0)}{(I(Si2p0))} \cdot \left(\frac{I_{infSi2p0}}{I_{infSi2s0}}\right)\right] = \frac{-(-\lambda_{Si2s0(2)} + \lambda_{Si2p0(2)})}{\lambda_{Si2s0(2)} \cdot \lambda_{Si2p0(2)}} \cdot t_2 + \quad (21)$$

$$(t_1 + t_3) \cdot \frac{-(-\lambda_{Si2s0(SiO2)} + \lambda_{Si2p0(SiO2)})}{\lambda_{Si2s0(SiO2)} \cdot \lambda_{Si2p0(SiO2)}}$$

$t_2$ can therefore be expressed as shown in equation (22):

$$t_2 = \frac{\ln\left[\frac{I(Si2s0)}{(I(Si2p0))} \cdot \left(\frac{I_{infSi2p0}}{I_{infSi2s0}}\right)\right] - (t_1 + t_3) \cdot \frac{-(-\lambda_{Si2s0(SiO2)} + \lambda_{Si2p0(SiO2)})}{\lambda_{Si2s0(SiO2)} \cdot \lambda_{Si2p0(SiO2)}}}{\frac{-(-\lambda_{Si2s0(2)} + \lambda_{Si2p0(2)})}{\lambda_{Si2s0(2)} \cdot \lambda_{Si2p0(2)}}} \quad (22)$$

Equation (22) will hereinafter be referred to as the functional relationship $t_{layer2} = f(t_{layer1} + t_{layer3})$. A ratio of the predictive intensity functions of the Hf4p and the Hf4f photoelectron species can be used to determine $t_1$. The ratio is given by equation (23):

$$\frac{I(Hf4p)}{I(Hf4f)} = \frac{\left[1 - e^{\left(\frac{-t_{HfO2}}{\lambda_{Hf4p(2)}}\right)}\right]}{\left[1 - e^{\left(\frac{-t_{HfO2}}{\lambda_{Hf4f(2)}}\right)}\right]} \cdot \frac{e^{\left(\frac{-t_{1SiO2}}{\lambda_{Hf4p(1)}}\right)}}{e^{\left(\frac{-t_{1SiO2}}{\lambda_{Hf4f(1)}}\right)}} \cdot \frac{I_{infHf4p}}{I_{infHf4f}} \quad (23)$$

Solving for $t_1$ gives equation (24):

$$t_1 = \frac{\ln\left[\frac{\left[1 - e^{\left(\frac{-t_{HfO2}}{\lambda_{Hf4p(2)}}\right)}\right]}{\left[1 - e^{\left(\frac{-t_{HfO2}}{\lambda_{Hf4f(2)}}\right)}\right]} \cdot \left(\frac{I(Hf4f)}{I(Hf4p)} \cdot \frac{I_{infHf4p}}{I_{infHf4f}}\right)\right]}{\frac{\lambda_{Hf4f(1)} - \lambda_{Hf4p(1)}}{\lambda_{Hf4p(1)} \cdot \lambda_{Hf4f(1)}}} \quad (24)$$

Removing the constant values from equation (24) and replacing them with $$k_{Hf} = \frac{I_{infHf4p}}{I_{infHf4f}}$$

and $$C_1 = \frac{\lambda_{Hf4f(1)} - \lambda_{Hf4p(1)}}{\lambda_{Hf4p(1)} \cdot \lambda_{Hf4f(1)}}$$

gives equation (25):

$$t_1 = \frac{\ln\left[\frac{\left[1 - e^{\left(\frac{-t_{HfO2}}{\lambda_{Hf4p(2)}}\right)}\right]}{\left[1 - e^{\left(\frac{-t_{HfO2}}{\lambda_{Hf4f(2)}}\right)}\right]} \cdot \left(\frac{I(Hf4f)}{I(Hf4p)} \cdot k_{Hf}\right)\right]}{C_1} \quad (25)$$

The thickness of the middle layer 704, or $t_2$, can thus be expressed as in equation (26):

$$t_2 = \frac{\ln\left[\frac{I(Si2s0)}{(I(Si2p0))} \cdot (k_{Si})\right] - (t_1 + t_3) \cdot C_2}{C_3} \quad (26)$$

where $$k_S = \frac{I_{infSi2p0}}{I_{infSi2s0}} \quad (27)$$

$$C_2 = \frac{-(-\lambda_{Si2s0(SiO2)} + \lambda_{Si2p0(SiO2)})}{\lambda_{Si2s0(SiO2)} \cdot \lambda_{Si2p0(SiO2)}} \quad (28)$$

$$C_3 = \frac{-(-\lambda_{Si2s0(2)} + \lambda_{Si2p0(2)})}{\lambda_{Si2s0(2)} \cdot \lambda_{Si2p0(2)}} \quad (29)$$

Equation (26) is the functional relationship between the thickness of the middle layer 704 ($t_2$) and the sum of the thicknesses of the silicon dioxide layers 702 and 704 ($t_1+t_3$). The thickness of the top silicon dioxide layer 702 can be given as equation (30):

$$t_1 = \frac{\ln\left[\frac{\left[1 - e^{\left(-\frac{\ln\left[\frac{I(Si2s0)}{(I(Si2p0))} \cdot (k_{Si})\right] - (t_1+t_3) \cdot C_2}{C_3 \lambda_{Hf4p(2)}}\right)}\right]}{\left[1 - e^{\left(-\frac{\ln\left[\frac{I(Si2s0)}{(I(Si2p0))} \cdot (k_{Si})\right] - (t_1+t_3) \cdot C_2}{C_3 \lambda_{Hf4f(2)}}\right)}\right]} \cdot \left(\frac{I(Hf4f)}{I(Hf4p)} \cdot k_{Hf}\right)\right]}{C_1} \quad (30)$$

A ratio of the predictive intensity functions of the emitted photoelectrons of the Si2p0 and Hf4f species is determined in block 756, and can be used to determine ($t_1+t_3$), $t_1$, and $t_2$. The ratio is shown in equation (31):

$$\frac{I(Si2p0)}{I(Hf4f)} = \frac{I_{infSi2p0}}{I_{infHf4f}} \cdot \frac{e^{\frac{-(t_1+t_3)}{\lambda_{Si2p(SiO2)}}} \cdot e^{\frac{-t_2}{\lambda_{Si2p(HfO2)}}}}{\left(1 - e^{\frac{-t_2}{\lambda_{Hf4f(HfO2)}}}\right) \cdot e^{\frac{-t_1}{\lambda_{Hf4f(SiO2)}}}} \quad (31)$$

Because $t_1$ and $t_2$ can be expressed in terms of ($t_1+t_3$), substituting equations (26) and (30) into equation (31) allows equation (31) to be solved by iteration in block 758. Equation (32) shows equations (26) and (30) substituted into equation (31):

$$\frac{I(Si2p0)}{I(Hf4f)} = \frac{I_{infSi2p0}}{I_{infHf4f}} \cdot \quad (32)$$

$$\frac{e^{\frac{-(t_1+t_3)}{\lambda_{Si2p(SiO2)}}} \cdot e^{\frac{\ln\left[\frac{I(Si2s0)}{(I(Si2p0))} \cdot (k_{Si})\right] - (t_1+t_3) \cdot C_2}{C_3 \lambda_{Si2p(HfO2)}}}}{\left[1 - e^{\frac{\ln\left[\frac{I(Si2s0)}{(I(Si2p0))} \cdot (k_{Si})\right] - (t_1+t_3) \cdot C_2}{C_3 \lambda_{Hf4f(HfO2)}}}\right]} \cdot$$

$$e^{\frac{\ln\left[\frac{\left[1 - e^{-\frac{\ln\left[\frac{I(Si2s0)}{(I(Si2p0))} \cdot (k_{Si})\right] - (t_1+t_3) \cdot C_2}{C_3 \lambda_{Hf4p(2)}}}\right]}{\left[1 - e^{-\frac{\ln\left[\frac{I(Si2s0)}{(I(Si2p0))} \cdot (k_{Si})\right] - (t_1+t_3) \cdot C_2}{C_3 \lambda_{Hf4f(2)}}}\right]} \cdot \left(\frac{I(Hf4f)}{I(Hf4p)} \cdot k_{Hf}\right)\right]}{C_1 \lambda_{Hf4f(SiO2)}}}$$

In block 760, $t_2$ is determined by inputting the solved value of ($t_1+t_3$) into equation (26). The thickness of the top layer 702 ($t_1$) may be determined in block 762 by inputting the determined value of ($t_1+t_3$) into equation (30). The value of the thickness of the bottom silicon dioxide layer 706 ($t_3$) can then be determined by subtracting the value of $t_1$ (determined above) from the value of ($t_1+t_3$) in block 764.

Figure 8A:
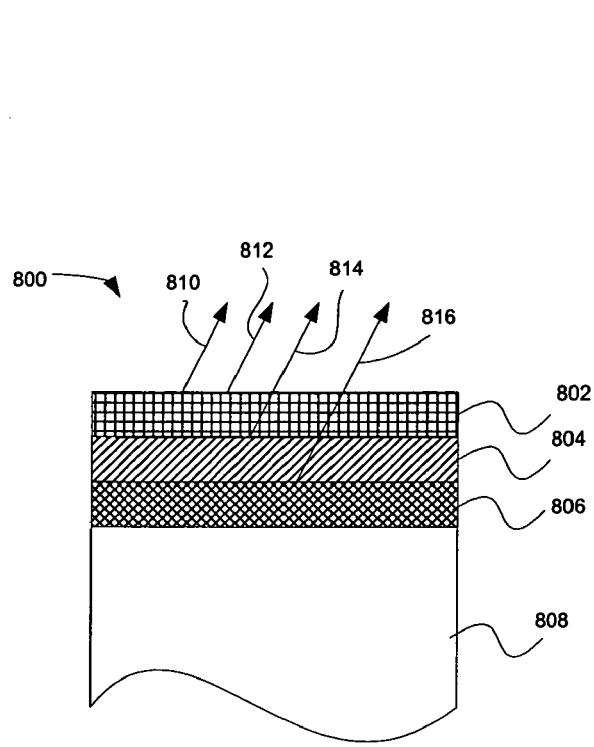
FIG. 8A illustrates three layers formed on a substrate.
Figure 8B:
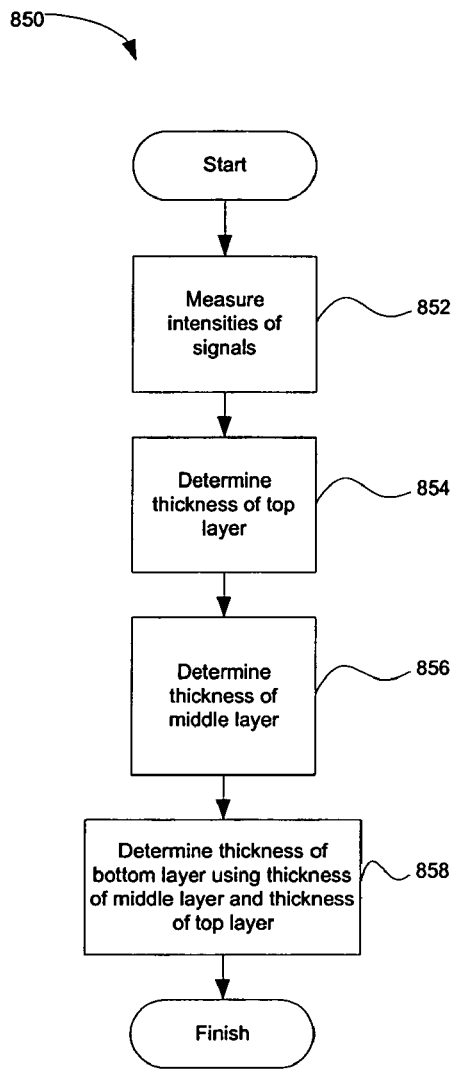
FIG. 8B is a flowchart describing a process for determining the thicknesses of the three layers.

FIG. 8A illustrates three layers formed on a substrate. FIG. 8B is a flowchart describing a process for determining thicknesses for the three layers. The structure 800 includes a top layer 802, a middle layer 804, and a bottom layer 806 formed over a substrate 808. The top layer 802 may be, for example, aluminum oxide, and may emit two photoelectron species (e.g., Al2s and Al2p shown in the signals 810 and 812). The middle layer 804 may be, for example, hafnium oxide, and may emit one photoelectron species (e.g., Hf4f shown in the signal 814). The bottom layer 806 may be, for example, titanium nitride, and may emit one photoelectron species (e.g., Ti2p shown in the signal 816). Using the process 850, no photoelectron signal from the substrate 808 needs to be used to determine the various thicknesses.

Generally the process 850 first determines the thickness of the top layer of a structure using the process 350, described above. Once the thickness of the top layer is determined, the thickness of the next layer below is determined by using the thickness of the top layer in an attenuation factor, and generating a ratio of predictive intensity functions of signals generated by the top layer and the current layer. In this way, the thicknesses of two layers of a structure may be determined. If the structure has three or more layers, the thickness of those layers may also be determined by generating ratios of various intensity functions and using attenuation factors dependent on known overlayer thicknesses.

In block 852, the necessary signals 810-816 are measured. In block 854, the thickness $t_{Al}$ of the top layer 802 is determined using the process 350 described above. A ratio of the two photoelectron signals emitted by the top layer 802 can be given by equation (33):

$$\frac{I(Al2s)}{I(Al2p)} = \frac{I_{(infAl2s)} \cdot \left[1 - e^{\left(\frac{-t_{Al}}{\lambda_{Al2s(Al)}}\right)}\right]}{I_{(infAl2p)} \cdot \left[1 - e^{\left(\frac{-t_{Al}}{\lambda_{Ti2p(Al)}}\right)}\right]} \quad (33)$$

The thickness $t_{Al}$ of the top layer 802 can be determine by iteration. The thickness $t_{Hf}$ of the middle layer 804 can be determined by generating a ratio of the predictive intensity function of one of the top layer's 802 photoelectron species (e.g., Al2p) and the predictive intensity function of the middle layer's 804 photoelectron species (Hf4f). The ratio is given in equation (34):

$$\frac{I(Al2p)}{I(Hf4f)} = \frac{I_{infAl2p} \cdot \left(1 - e^{\frac{-t_{Al}}{\lambda_{Al2p(Al)}}}\right)}{I_{infHf} \cdot \left(1 - e^{\frac{-t_{Hf}}{\lambda_{Hf(Hf02)}}}\right) \cdot e^{\frac{-t_{Al}}{\lambda_{Hf4f(Al)}}}} \quad (34)$$

The predictive intensity function of the Hf4f photoelectron species is of the form of equation (2), since the Hf4f photoelectron signal is attenuated by the top layer 802. In block 856, the ratio shown in equation (34) is iterated to give the unique value for the thickness of the middle layer 804, $t_{Hf}$.

In block 858, the thickness $t_{TiN}$ of the bottom layer 806 is determined. The thickness of the bottom layer 806 may be determined by generating a ratio of predictive intensity functions of photoelectrons emitted by the bottom layer 806 (e.g., the Ti2p photoelectron species) and another layer (e.g., the Al2p photoelectron species emitted by the top layer 802). Since the photoelectrons emitted by the bottom layer 806 are attenuated by both the middle layer 804 and the top layer 802, the predictive intensity function of the photoelectrons emitted by the bottom layer 806 is of the form of equation (2). The ratio is given by equation (35):

$$\frac{I(Al2p)}{I(Ti2p)} = \frac{I_{(infAl2p)} \cdot \left[1 - e^{\left(\frac{-t_{Al}}{\lambda_{Al2p(Al)}}\right)}\right]}{I_{infTi2p} \cdot e^{\frac{-t_{Al}}{\lambda_{Ti2p(Al)}}} \cdot e^{\frac{-t_{Hf02}}{\lambda_{Ti2p(Hf02)}}} \cdot \left(1 - e^{\frac{-t_{TiN}}{\lambda_{Ti2p(TiN)}}}\right)} \quad (35)$$

Since $t_{AlO2}$ and $t_{HfO2}$ are already known, the equation 35 may be iterated to solve for a unique value of $t_{TiN}$.

It is understood that although specific material and photoelectron species are described in the examples herein, that other, similar equations may be formulated to determine the thicknesses of layers in other structures. This invention has been described with reference to specific exemplary embodiments thereof. It will, however, be evident to persons having the benefit of this disclosure that various modifications and changes may be made to these embodiments without departing from the broader spirit and scope of the invention. The specification and drawings are accordingly to be regarded in an illustrative rather than in a restrictive sense.

What is claimed is:

1. A method for determining a thickness of a layer using electron spectroscopy comprising:
   determining a first predictive intensity function for a first electron species of the layer dependent on the thickness of the layer;
   determining a second predictive intensity function for a second electron species of the layer dependent on the thickness of the layer;
   determining a ratio of the first and second predictive intensity functions; and
   iterating the ratio to determine the thickness of the layer, wherein a first measured intensity of the first electron species and a second measured intensity of the second electron species are also used to determine the thickness of the layer.

2. The method of claim 1, wherein the first predictive intensity function and the second predictive intensity function are also dependent on an electron attenuation length (EAL) of the layer and a measured intensity of an electron species emitted by a layer having infinite thickness.

3. The method of claim 2, wherein the first predictive intensity function and the second predictive intensity function are dependent on an intensity of an electron emitted by a layer thicker than ten nanometers (nm).

4. The method of claim 3, wherein the first predictive intensity function and the second predictive intensity function are of the form:

$$I(X_i) = I_{infXi} \cdot \left[1 - e^{\left(\frac{-t_x}{\lambda_{Xi(X)}}\right)}\right].$$

5. The method of claim 1, wherein the first measured intensity and the second measured intensity are fitted and wherein the first measured intensity and the second measured intensity are subject to background subtraction.

6. The method of claim 1, further comprising:
   measuring the first measured intensity of the first electron species and the second measured intensity of the second electron species using x-ray photoelectron spectroscopy (XPS).

7. The method of claim 1, further comprising:
   measuring the first measured intensity of the first electron species and the second measured intensity of the second electron species using Auger electron spectroscopy (AES).

8. A method for determining a thickness of a layer in a multi-layer structure comprising:
   determining a first predictive intensity function for a first characteristic electron species of the layer dependent on the thickness of the layer;
   determining a second predictive intensity function for a second characteristic electron species of the multi-layer structure;
   measuring a first intensity of the first characteristic electron species and a second intensity of the second characteristic electron species using x-ray photoelectron spectroscopy (XPS) or other electron spectroscopy;
   determining a ratio of the first and second predictive intensity functions; and
   iterating the ratio to determine the thickness of the layer, wherein the first intensity of the first characteristic electron species and the second intensity of the second characteristic electron species are also used to determine the thickness of the layer, wherein if the layer is beneath a second layer of the multi-layer structure, determining the first predictive intensity function including an attenuation factor dependent on a thickness of the second layer, wherein the second layer comprises an oxide of silicon, wherein the thickness of the second layer is given by:

$t_{SiO2} = \sin(\alpha) \ln[(I(SiO)/I(Si4+)*k+1]$.

9. The method of claim 8, wherein the second characteristic electron species is of a substrate of the multi-layer structure.

10. The method of claim 8, wherein the first predictive intensity function is given by:

$$I(X) = I_{infX} \cdot \left[1 - e^{\left(\frac{-t_x}{\lambda X(X)}\right)}\right] \cdot e^{\frac{-t_y}{\lambda X(Y)}}.$$

11. The method of claim 8, wherein the second characteristic electron species is of a third layer beneath the layer, and wherein the second predictive intensity function includes an attenuation factor dependent on the thickness of the layer.

12. The method of claim 9, wherein the second predictive intensity function includes an attenuation factor dependent on the thickness of the layer.

13. The method of claim 12, wherein the second predictive intensity function includes a second attenuation factor dependent on a thickness of a third layer between the substrate and the layer.

14. A method for determining a thickness of a layer in a multi-layer structure comprising:
bombarding the structure with radiation;
analyzing electrons ejected by the structure including a first electron species ejected by the layer and a second electron species ejected by the structure, wherein the multi-layer structure includes the layer over a second layer comprising a silicon oxide;
determining a first predictive intensity function for the first electron species dependent on a thickness of the layer and a second predictive intensity function for the second electron species;
formulating a ratio of the first and second predictive intensity functions;
iterating the ratio to determine the thickness of the layer;
determining a thickness of the second layer using $t_{SiO2} = \sin(\alpha) \ln[(I(SiO)/I(Si4+)* k+1]$; and
determining a thickness of the layer using the ratio,
wherein the first electron species is emitted by the layer and the first predictive intensity function is given by $$I(X_i) = I_{infXi} \cdot \left[1 - e^{\left(\frac{-t_x}{\lambda Xi(X)}\right)}\right];$$

wherein the second predictive intensity function is given by:

$$I(X)I_{infX} \cdot \left[1 - e^{\left(\frac{-t_x}{\lambda X(X)}\right)}\right] \cdot e^{\frac{-t_y}{\lambda X(Y)}}.$$

15. The method of claim 14, wherein bombarding the structure comprises:
bombarding the structure with x-rays using XPS;
wherein the first electron species and the second electron species are photoelectrons.

16. The method of claim 14, wherein bombarding the structure comprises:
bombarding the structure with electrons using Auger electron spectroscopy;
wherein the first electron species and the second electron species are Auger electrons.

17. The method of claim 14, wherein the multi-layer structure includes a third layer over the layer.

18. The method of claim 14, wherein the second electron species is emitted by a substrate of the structure.

19. A method for determining a thickness of a layer in a multi-layer structure comprising:
bombarding the structure with radiation;
analyzing electrons ejected by the structure including a first electron species and a second electron species, wherein the first electron species and the second electron species are both emitted by the layer;
determining a first predictive intensity function for the first electron species dependent on a thickness of the layer and a second predictive intensity function for the second electron species dependent on the thickness of the layer;
formulating a ratio of the first and second predictive intensity functions; and
iterating the ratio to determine the thickness of the layer.

20. The method of claim 19, further comprising:
analyzing a third electron species emitted by a second layer beneath the layer;
determining a third predictive intensity function dependent on the thickness of the layer;
formulating a ratio including the third predictive intensity function and one of the first and second predictive intensity functions;
iterating the ratio to determine a thickness of the second layer.

21. The method of claim 20, wherein the third predictive intensity function is given by:

$$I(X)I_{infX} \cdot \left[1 - e^{\left(\frac{-t_x}{\lambda X(X)}\right)}\right] \cdot e^{\frac{-t_y}{\lambda X(Y)}}.$$

22. A machine readable medium having stored thereon executable program code which, when executed, causes a machine to perform a method for determining a thickness of a layer using electron spectroscopy, the method comprising:
determining a first predictive intensity function for a first electron species of the layer dependent on the thickness of the layer;
determining a second predictive intensity function for a second electron species of the layer dependent on the thickness of the layer;
determining a ratio of the first and second predictive intensity functions; and
iterating the ratio to determine the thickness of the layer, wherein a first measured intensity of the first electron species and a second measured intensity of the second electron species are also used to determine the thickness of the layer.

23. The machine readable medium of claim 22, wherein the first predictive intensity function and the second predictive intensity function are also dependent on an electron attenuation length (EAL) of the layer and a measured intensity of an electron species emitted by a layer having infinite thickness.

24. The machine readable medium of claim 23, wherein the first predictive intensity function and the second predictive intensity function are dependent on an intensity of an electron emitted by a layer thicker than ten nanometers (nm).

25. The machine readable medium of claim 24, wherein the first predictive intensity function and the second predictive intensity function are of the form:

$$I(X_i) = I_{infXi} \cdot \left[1 - e^{\left(\frac{-t_x}{\lambda_{Xi(X_1)}}\right)}\right].$$

26. The machine readable medium of claim 22, wherein the first measured intensity and the second measured intensity are fitted and wherein the first measured intensity and the second measured intensity are subject to background subtraction.

27. The machine readable medium of claim 22, the method further comprising:
measuring the first measured intensity of the first electron species and the second measured intensity of the second electron species using x-ray photoelectron spectroscopy (XPS).

28. The machine readable medium of claim 22, the method further comprising:
measuring the first measured intensity of the first electron species and the second measured intensity of the second electron species using Auger electron spectroscopy (AES).

* * * * *